United States Patent

[11] 3,599,095

[72] Inventor William R. Johnson
 Cranada Hills, Calif.
[21] Appl. No. 2,008
[22] Filed Jan. 12, 1970
[45] Patented Aug. 10, 1971
[73] Assignee TRW Inc.
 Redondo Beach, Calif.

[54] METHOD OF AND MEANS FOR TESTING AN ELECTRICAL BOND TO DETERMINE ITS HIGH FREQUENCY IMPEDANCE
8 Claims, 1 Drawing Fig.

[52] U.S. Cl. ............................................. 324/64
[51] Int. Cl. ......................................... G01r 27/14
[50] Field of Search ............................ 324/64, 58

[56] References Cited
UNITED STATES PATENTS
3,192,474 6/1965 Cherry .......................... 324/64 X Primary Examiner—Edward E. Kubasiewicz
Attorneys—Daniel T. Anderson, Donald R. Nyhagen and Jerry A. Dinardo ABSTRACT: A method of and means for testing an electrical bond between two conductors, such as a ground plate and a radio frequency shielded enclosure bonded to the plate, to determine the high frequency impedance of the bond. The test procedure involves passing a high frequency current through the conductors and the bond, measuring the voltage drop across the bond by placing a capacitance probe in capacitively coupled relation to one conductor and measuring the voltage of the probe relative to the other conductor, and measuring the high frequency current flow at a number of measurement positions spaced along a closed path on the surface of the latter conductor encircling the bond by placing an inductance probe in inductively coupled relation to the surface at each position and measuring the voltage induced in the latter probe at each position. The high frequency impedance of the bond is then obtained by using the equation:

$$Z = \frac{V}{\Sigma H \cdot \Delta L}$$

where $Z$ is the impedance, $V$ is the capacitance probe voltage, $H$ is the inductance probe voltage, and $\Delta L$ is the distance between measurement positions.

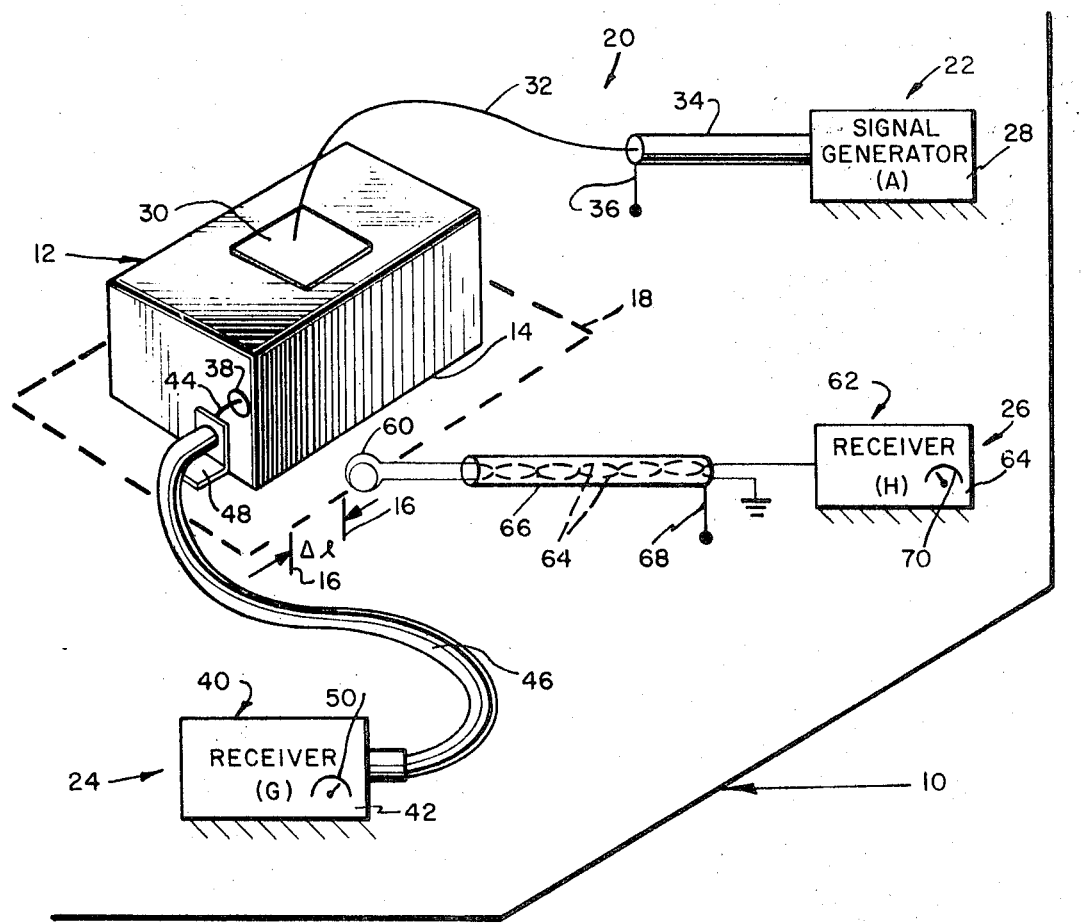
William R. Johnson
INVENTOR.

METHOD OF AND MEANS FOR TESTING AN ELECTRICAL BOND TO DETERMINE ITS HIGH FREQUENCY IMPEDANCE

BACKGROUND OF THE INVENTION

1. Field of the Invention

This invention relates generally to the art of electrical testing and more particularly to a method of and means for testing an electrical bond to determine its high-frequency impedance.

2. Prior Art

Electrical bonding may be defined as a low-impedance electrical connection between two or more electrical conductors. This electrical bonding is required in many electronic devices. For example, different parts of an electronic circuit must be shielded from one another to minimize electromagnetic interference in the circuit. This is accomplished by enclosing the sensitive parts of the circuit in metallic shielding enclosures and electrically bonding these enclosures to a metallic chassis which serves as a ground plate.

The effectiveness of such a shielding arrangement is dependent upon the high-frequency impedance of the electrical bonds between the shielding enclosures and the ground plate. This is to say, high shielding efficiency requires electrical bonds of low radio frequency impedance. Accordingly, construction of electronic circuits embodying such shielding means requires testing of the electrical bonds between the shielding enclosures and the ground plate to determine the radio frequency impedance of the bonds. While various techniques have been devised for measuring the impedance of an electrical bond at relatively low frequencies, i.e. near DC frequencies, no methods are currently available for determined or measuring bond impedance at relatively high frequencies, such as frequencies in the tens of megacycles range.

SUMMARY OF THE INVENTION

The present invention provides a method of and means for testing an electrical bond between two conductors, such as the chassis or metallic ground plate of an electronic circuit and a metallic shielding enclosure bonded to the plate, to determine the high-frequency impedance of the bond. According to the invention, a high-frequency current is passed through the conductors by placing an injection plate in capacitively coupled relation to one conductor and impressing a high-frequency voltage across this plate and the other conductor. The high-frequency voltage drop across the bond is then measured by placing a capacitance probe in capacitively coupled relation to one conductor and measuring the voltage of this probe relative to the other conductor. The high-frequency current flow is also measured at a number of measurement positions spaced along a closed path on the surface of the other conductor encircling the bond by placing an inductance probe in inductively coupled relation to the surface at each position and measuring the voltage induced in the latter probe at each position. The high-frequency impedance of the bond is then obtained by the equation:

$$Z = V/(\Sigma H \cdot \Delta L)$$

where $Z$ is the impedance, $V$ is the capacitance probe voltage, $H$ is the inductance probe voltage, and $\Delta L$ is the distance between measurement positions.

BRIEF DESCRIPTION OF THE DRAWING

The single figure of the drawing illustrates, in semidiagrammatic fashion, apparatus according to the invention for testing a bond between a ground plate and a radio frequency shielding enclosure bonded to the plate.

DESCRIPTION OF THE PREFERRED EMBODIMENTS

Turning now to these drawings, there is illustrated two electrical conductors 10 and 12 joined by an electrical bond 14. In this instance, conductor 10 is the metallic chassis or ground plate as it is referred to herein, of an electronic circuit and conductor 12 is a metallic shielding enclosure bonded to the ground plate. As noted earlier, a typical electronic circuit embodies a number of such shielding enclosures each of which must be effectively bonded to the ground plate in such a way as to provide a low-impedance electrical connection between each enclosure and the ground plate and thereby between the several enclosures. The present invention is concerned with testing the electrical bond 14 between the ground plate 10 and each shielding enclosure 12 to determine the high-frequency impedance of the bond.

Briefly, the present method of testing the electrical bond 14 involves passing a high-frequency current through the bond 14, measuring the high-frequency voltage drop across the bond, and measuring the high-frequency current flow at a number of measurement positions 16 spaced along a closed path 18 encircling the bond. The high-frequency impedance of the bond is then determined or calculated by dividing the voltage drop by the current, the current being determined by measurement at several positions about the closed path 18.

Referring now in greater detail to the drawings, the test equipment 20 for performing the bond impedance testing procedure briefly described above, comprises three main elements, to wit a means 22 for passing current through the bond 14, a means 24 for measuring the high-frequency voltage drop across the bond, and a means 26 for measuring high frequency current flow at the measurement positions 16. Means 22 includes a high frequency signal generator 28 grounded to the ground plate 10, a metallic injection plate 30 to be placed in capacitively coupled relation to the enclosure 12, and a lead 32 connecting the output of the signal generator to the injection plate. Surrounding this lead is a tubular shield 34 which is connected to the ground plate 10 by a shield terminator 36. The signal generator 28 impresses a high frequency voltage between the ground plate 10 and the injection plate 30 to induce high frequency current flow through the ground plate and the enclosure 12 and across the electrical bond 14. The signal generator 28 is set to operate at the frequency at which the impedance of the bond 14 is to be determined. It will be understood that the test may be conducted at any selected frequency. As noted earlier, however, the primary advantage of the invention resides in its ability to test or measure the impedance of the bond 14 at relatively high frequencies which may be in the tens of megacycles range.

The means 24 for measuring the high frequency voltage drop across the bond 14 comprises a capacitance probe 38 to be placed in capacitively coupled relation to the enclosure 12, adjacent the bond, and means 40 for measuring the voltage of the probe relative to a point on the ground plate 10 adjacent the bond. This probe voltage measuring means includes a high-frequency receiver 42 tuned to the frequency of the generator 22. The receiver is grounded to the ground plate 10 and connected to the capacitance probe 38 by a lead 44. Enclosing the lead is a tubular shield 46, the outer end of which is connected to the ground plate, adjacent the bond 14, by a shield termination bracket 48. The capacitance probe 38 is connected connected to the input of the receiver 42 so that the voltage developed on the probe is applied to the receiver input. The receiver is equipped with means 50 for reading out the probe voltage.

The high-frequency current measuring means 26 comprises an $H$ field or inductance probe 60, such as a wire coil, to be placed in inductively coupled relation to the surface of the ground plate 10 at each measurement position 16, whereby the current flow in the plate induces a voltage in the coil, and means 62 for measuring this induced voltage. Probe voltage measuring means 62 includes a high-frequency receiver 64 grounded to the plate 10 and tuned to the same frequency as the signal generator 28. Twisted leads 64 connect the receiver to opposite ends of the inductance probe or coil 60. Surrounding the twisted leads 64 is a tubular shield 66 which is connected to the ground plate 10 by a shield termination 68. Receiver 64 is provided with means 60 for reading out the voltage induced in the inductance probe 60 at each measurement position 16.

The bond 14 is tested by operating the signal generator 28 to impress a high-frequency voltage between the ground plate 10 and the injection plate 20. This causes high-frequency current flow through the ground plate, the shielding enclosure 12, and the bond 14. The high-frequency current flows downwardly along the sides of the enclosure, across the bond 14, into the baseplate 10, developing in the capacitance probe 38 a voltage, relative to the baseplate, approximately equal to the voltage drop across the bond. This voltage developed on the capacitance probe is applied to the input of the receiver 42 and is displayed on its readout 50.

The inductance probe 60 is placed in inductively coupled relation to the surface of the baseplate 10 at each of the measurement positions 16 along the path 18. The high-frequency current flow across the surface of the baseplate 10 at each of the measurement positions 16 along the path 18. The high-frequency current flow across the surface of the baseplate at each position induces in the probe a voltage proportional to the current flow. This voltage is applied to the input of the receiver 64 and is displaced on the receiver readout 70.

At this point, it is significant to note that the shape of the path 18 along which the current flow measurements are taken is arbitrary. However, the path must encircle the enclosure 12 and its bond 14 but not the shield termination 36 of the signal generator 28. The number of points 16 at which the current measurements are taken along the path is also arbitrary and determined by the test accuracy desired.

The actual impedance of the bond 14 at the test frequency is calculated from the equation:

$$Z = V/I$$

where $Z$ is the impedance, $V$ is the measured voltage of the capacitance probe 38, and $I$ is the total current flow across the measurement path 18 as determined from the current flow measurements at the several measurement positions 16.

This total current flow $I$ is determined by using Ampere's Line Integral Law:

$$I = \oint_0^1 H dl$$

where $H$ is proportional to the voltage induced in the inductance probe 60 at a measurement point 16 along the path 18 and $dl$ is the distance between measurement points.

Thus, the total current flow $I$ is calculated by multiplying the induced voltage at each measurement point 16 by the distance $\Delta L$ between the measurement points, multiplying by a proportionality factor to obtain $H$ and summing the several $H\Delta L$ products. That is to say:

$$I = \sum_{i=1}^{n} H\Delta L$$

From the foregoing discussion, it is evident that the impedance of the bond 14 at the test frequency is expressed by the equation:

$$Z = \frac{V}{\sum_{i=1}^{n} H\Delta L}$$

What I claim as new in support of Letters Patent is:

1. The method of testing an electrical bond between two conductors to determine the high-frequency impedance of the bond, which method comprises the steps of:
   passing high-frequency current through said conductors and bond;
   measuring the voltage drop across said bond by placing a capacitance probe in capacitively coupled relation to the surface of one conductor adjacent said bond and measuring the voltage of said probe relative to a point on the other conductor adjacent said bond; and
   measuring the high-frequency flow at a number of measurement positions spaced along a closed path on the surface of said other conductor enclosing said bond by placing an inductance probe in inductively coupled relation to the latter surface at each said position and measuring the voltage induced in the latter probe at each position, whereby said impedance may be calculated from the equation:

$$Z = \frac{V}{\sum_{i=1}^{n} H\Delta L}$$

where $Z$ is the impedance, $V$ is the capacitance probe voltage, $H$ is proportional to the inductance probe voltage, and $\Delta L$ is the distance between said measurement points.

2. The testing method of claim 1 wherein:
   said one conductor is a metallic shielding enclosure and said other conductor is a ground plate to which said enclosure is bonded; and
   said path encircles said enclosure 3. The testing method according to claim 1 wherein:
   said step of passing high-frequency current flow through said conductors involves placing an injector plate in capacitively coupled relation to said one conductor and impressing a high-frequency voltage between said plate and a point on said other conductor at the side of said path remote from said bond.

4. The testing method according to claim 2 wherein:
   said step of passing high-frequency current flow through said conductor involves placing an injection plate in capacitively coupled relation to said enclosure, and impressing a high-frequency voltage between said injection plate and a point on said ground plate outside of the area encircled by said path.

5. Means for testing an electrical bond between two conductors to determine the high-frequency impedance of the bond, comprising:
   means for passing high-frequency current through said conductors and said bond;
   means for measuring the high-frequency voltage drop across said bond including a capacitance probe to be placed in capacitively coupled relation to one conductor adjacent said bond and means for measuring the voltage of said probe relative to a point on the other conductor adjacent said bond; and
   means for measuring the high-frequency current flow at a number of measurement points spaced along a closed path on the surface of said other conductor encircling said bond including an inductance probe to be placed in inductively coupled relation to the latter surface at each of said measurement points, and means for measuring the voltage induced in the latter probe at each point, whereby said impedance may be calculated from the equation:

$$Z = \frac{V}{\sum_{i=1}^{n} H\Delta L}$$

where $Z$ is the impedance, $V$ is the capacitance probe voltage, $H$ is proportional to the inductance probe voltage, and $\Delta L$ is the e distance between said measurement points.

6. Testing means according to claim 5 wherein:
   said means for passing high-frequency current flow through said conductors comprises a signal generator grounded to said other conductor at the side of said path remote from said one conductor, and a capacitance probe to be placed in capacitively coupled relation to said one conductor and connected to the output of said generator.

7. Testing means according to claim 6 wherein:
   said one conductor is a metallic shielding enclosure and said other conductor is a metallic ground plate to which said enclosure is bonded; and said path encircles said enclosure.

8. Testing means according to claim 7 wherein:

said signal generator includes a lead connected to said injection plate, a tubular shield surrounding said lead, and means grounding said latter lead to said ground plate outside of the area enclosed by said path;

said capacitance probe comprises a capacitance plate and said capacitance probe voltage-measuring means comprises a high-frequency receiver grounded to said ground plate, a lead connecting said capacitance plate to the input of said receiver, a tubular shield surrounding the latter lead, and means grounding the latter shield to said ground plate adjacent said bond; and said inductance probe comprises a coil, and said inductance probe voltage measuring means comprises a high-frequency receiver grounded to said ground plate outside of the area enclosed by said path, a twisted lead connecting the ends of said coil to the input of said receiver, a tubular shield surrounding the latter lead, and means grounding the latter shield to said ground plate outside of the area enclosed by said path.

UNITED STATES PATENT OFFICE
CERTIFICATE OF CORRECTION

Patent No. 3,599,095  Dated August 10, 1971

Inventor(s) William R. Johnson

It is certified that error appears in the above-identified patent and that said Letters Patent are hereby corrected as shown below:

| | | |
|---|---|---|
| Column 2, line 75 | | change "60" to -- 70 -- |
| Column 3, line 17 | | delete "10 at each of" |
| | line 18 | delete in its entirety |
| | line 19 | delete "frequency current flow across the surface of the baseplate" |

Signed and sealed this 16th day of July 1974.

(SEAL)
Attest:

McCOY M. GIBSON, JR.  C. MARSHALL DANN
Attesting Officer  Commissioner of Patents